United States Patent [19]

Davidson et al.

[11] Patent Number: 4,713,757
[45] Date of Patent: Dec. 15, 1987

[54] DATA MANAGEMENT EQUIPMENT FOR AUTOMATIC FLIGHT CONTROL SYSTEMS HAVING PLURAL DIGITAL PROCESSORS

[75] Inventors: Dale D. Davidson; Douglas G. Endrud, both of Glendale, Ariz.

[73] Assignee: Honeywell Inc., Minneapolis, Minn.

[21] Appl. No.: 743,535

[22] Filed: Jun. 11, 1985

[51] Int. Cl.⁴ .............................................. G06F 11/16
[52] U.S. Cl. ....................................... 364/200; 371/68
[58] Field of Search ... 364/200 MS File, 900 MS File; 371/13, 38, 51, 68

[56] References Cited

U.S. PATENT DOCUMENTS

| | | | |
|---|---|---|---|
| 3,231,858 | 1/1966 | Tuomenoksa et al. | 371/38 |
| 3,699,532 | 10/1972 | Schaffer et al. | 364/200 |
| 3,950,729 | 4/1976 | Fletcher et al. | 364/200 |
| 4,028,668 | 6/1977 | Riikonen | 364/200 |
| 4,156,932 | 5/1979 | Robinson et al. | 364/200 |
| 4,217,486 | 8/1980 | Tawfik et al. | 371/68 |
| 4,270,168 | 5/1981 | Murphy et al. | 364/200 |

Primary Examiner—Archie E. Williams, Jr.
Assistant Examiner—Michael J. Ure
Attorney, Agent, or Firm—Albin Medved; Seymour Levine

[57] ABSTRACT

An automatic flight control system having two digital processors receives sensor data over a bit serial data bus through a serial-to-parallel converter. The converter formats the data into bytes corresponding to the data parameters from the sensors. One of the processors controls the bus timing and receives the data bytes which are simultaneously applied to an independent data storage element. An independent address sequencer provides sequential addresses to the independent data storage element at which to store sequential data bytes from the converter. After an entire data frame is stored in the independent data storage element, the second processor performs a bulk move of the data into its local data storage element. The sensors are configured in data subsystems which provide respective messages, each message containing an address identifying the subsystem. These addresses are utilized for directing the data messages to respective areas in the independent data storage element. The other processor compares addresses to determine that the data messages are not scrambled.

9 Claims, 2 Drawing Figures

DATA MANAGEMENT EQUIPMENT FOR AUTOMATIC FLIGHT CONTROL SYSTEMS HAVING PLURAL DIGITAL PROCESSORS

BACKGROUND OF THE INVENTION

1. Field of the Invention

The invention relates to digital automatic flight control systems, particularly with respect to data management apparatus therefor.

2. Description of the Prior Art

Present day digital automatic flight control system channels traditionally utilize dual digital processors responsive to the same or similar data with cross processor monitoring for detecting random failures or generic design errors in the channels, thereby providing fail passive performance. The dual processors may be identical with respect to each other in hardware and software performing identical tasks. Alternatively, the processors may provide dissimilar data processing with respect to each other while performing identical tasks. In this arrangement, the processors may be dissimilar with respect to hardware, with respect to software or with respect to both hardware and software. A further dual processor fail passive arrangement is disclosed in copending patent application Ser. No. 739,583 filed May 30, 1985 in the names of the present inventors, and entitled "Digital Automatic Flight Control System with Disparate Function Monitoring". In the system of said Ser. No. 739,583 the dual processors are similar with respect to each other in hardware and software, but perform disparate tasks over disjoint computation paths with respect to each other. One of the processors performs an automatic flight control system function, while the other processor executes a monitor for that function to determine if the aircraft if performing in a manner prohibited by the function.

The two processors may have access to a single data sensor set traditionally including a plurality of sensor subsystems to provide input information to the processors for controlling the aircraft. Each subsystem provides a plurality of data items formatted as a sequence of words or bytes. Typically a byte may comprise eight bits. One such subsystem comprises the air data computer subsystem that provides data with respect to Mach, airspeed, dynamic pressure, vertical speed and the like. Another such subsystem is the attitude and heading reference system (AHRS) that provides such data as roll and pitch attitude, heading, accelerations and body rates utilized, for example, to stabilize the inner loops of the automatic flight control system. Another such input data subsystem is the navigation subsystem providing such data as present position, velocity, acceleration and the like. The output from each subsystem containing the sequence of bytes therefrom may be considered as a data message from the subsystem.

In such digital automatic flight control systems, it is desirable to utilize a single, bit serial data bus to convey the data messages from the sensor subsystems to the processors. The single bus architecture is simpler in hardware configuration, less bulky, less expensive and lighter weight than, for example, a parallel bus architecture, which qualities are significant for efficacious utilization in present day aircraft. In such a single, bit serial data bus system, a large amount of data is transferred between the sensor subsystems and the processor inputs during each iteration of the flight control program. Since the data transfer is bit serial, the data rates utilized are extraordinarily high. Conventionally, one of the dual processors controls the bus timing and accepts all of the data utilizing such well known techniques as direct memory accessing, program interrupts or sensor polling. During the computation cycle of the flight control program, the data acquiring processor utilizes the data in the programs stored therein and also provides the data to the second processor for the redundant or dissimilar processing in the cross-processor monitoring arrangement to detect random faults and generic design errors as discussed above.

In such a system, the data receiving processor may corrupt the input data, utilize the corrupted data in its own processing and send the corrupted data to the other processor for cross-processor monitoring purposes. Since the data utilized by both processors is identical, although erroneous, the cross-processor monitoring may detect the same although incorrect outputs from both processors thereby not detecting that an error has occurred. Under such circumstances, dangerous data may propagate to the control surface servos to precipitate a hazardous situation. Specifically, in the system of said Ser. No. 739,583, utilizing similar processors but task dissimilarity, if the dissimilar tasks require the same data and corrupted data is utilized in performing the automatic flight control system functionality and the corresponding monitoring, the system of said Ser. No. 739,583 may not detect the erroneous situation thereby propagating a hazardous condition. Such undetected hazardous malfunctions may also result from the data receiving processor destroying data, scrambling data message blocks with respect to the sensor subsystems and scrambling data within the data message blocks.

Another prior art arrangement utilizing two processors that require the same data is the provision of a buffer to hold the data such that both processors have access thereto when required. Such an arrangement is utilized when inputting analog data via an analog-to-digital converter associated with each processor. Such an arrangement is not utilized with digital data and is completely impractical with the high speed, bit serial data transfer described above.

SUMMARY OF THE INVENTION

It is an objective of the present invention to provide data integrity to multiple processors configured in a cross-processor performance assessment arrangement for hazard protection. This objective is achieved by data management apparatus for an automatic flight control system that includes at least two digital data processors that require data from the aircraft sensor complement. The data is transmitted, via a bus, from the sensors for storage in one of the processors where the bus is controlled by that processor. The data is simultaneously entered into an independent data storage unit that is addressed by an independent data storage sequencer that is synchronized by the data receiving processor. After all of the data is received, the other processor accesses the independent data storage element for receiving the data stored therein for storage and utilization within the other processor. The apparatus is constructed and arranged such that the data receiving processor cannot write into the independent data storage element so that the data receiving processor cannot corrupt or destroy data stored therein.

DESCRIPTION OF THE PREFERRED EMBODIMENT

Figure 1:
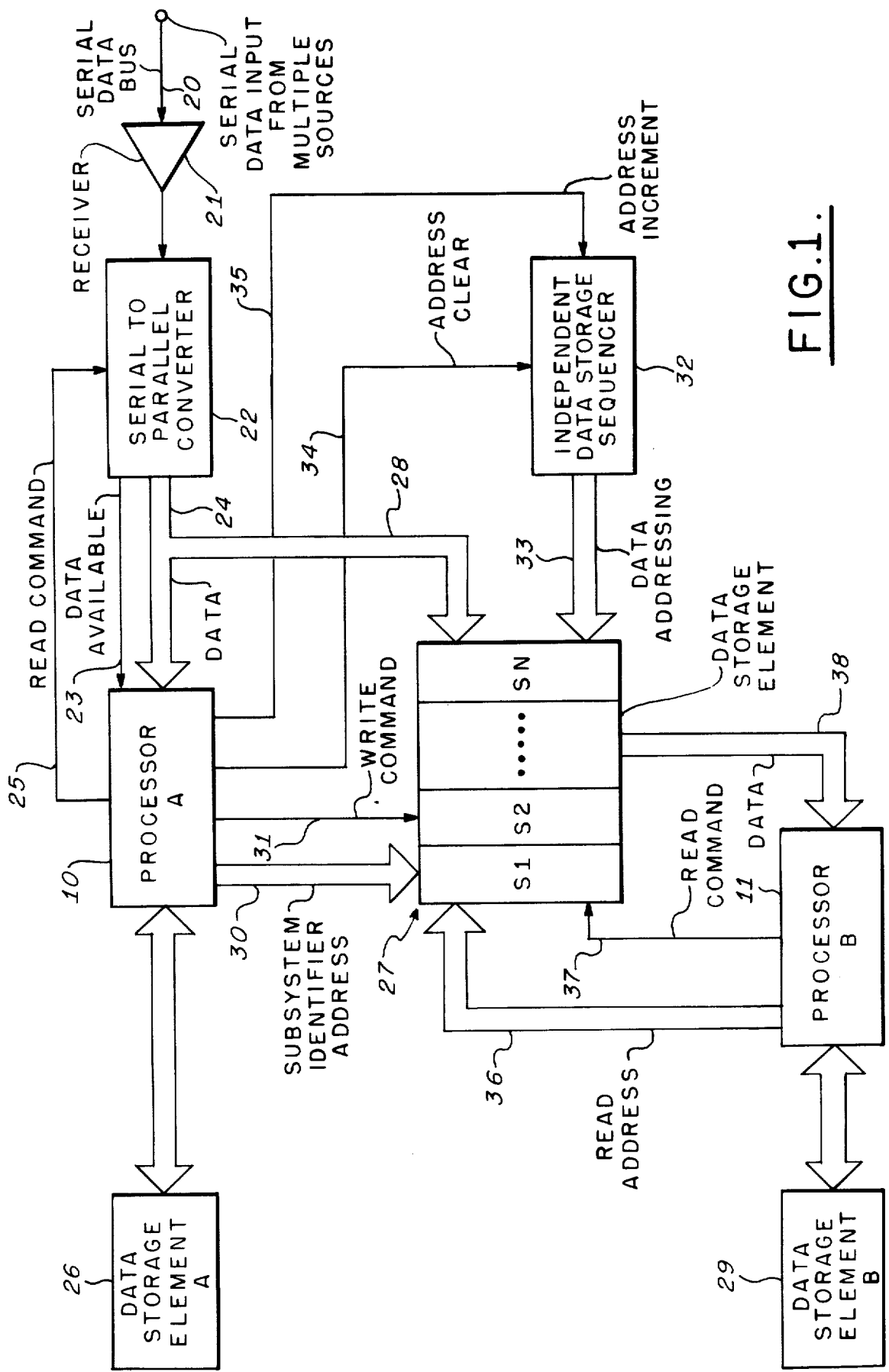
FIG. 1 is a schematic block diagram illustrating the data management apparatus of the present invention.

Referring to FIG. 1, data management apparatus in accordance with the present invention is illustrated. The invention may be utilized in an automatic flight control system of the type described in said Ser. No. 739,583 which is incorporated herein by reference in its entirety. The automatic flight control system includes an A-processor 10 and a B-processor 11 utilized within the system in a manner similar to that described in said Ser. No. 733,583. As described in said Ser. No. 735,583, the processors 10 and 11 are preferably identical and of conventional architecture, and are of the general purpose, medium scale design, a variety of which are commercially procurable, and may be used in specifically constructed computers for airborne analysis and control for automatic flight control and flight director applications. Preferably, an FZ-803 digital flight control computer commercially procurable from the Avionics Division of the Aerospace and Marine Group of the Sperry Corporation may be utilized in implementing the system. The FZ-800 computer is based on the Zylog Z-8002 microprocessor. Details with respect to the internal arrangement of the digital processors 10 and 11 and programs stored therein are described in said Ser. No. 739,583. In the system of said Ser. No. 739,583, each of the processors 10 and 11 perform active automatic flight control system functions as well as monitoring functions therefor in the manner described therein. These active and monitoring functions are performed in response to data provided from plural sensor subsystems of the type described above where each subsystem provides a sequence of words or bytes conveying information with respect to the plurality of parameters that the sensors of the subsystem are measuring.

Figure 2:
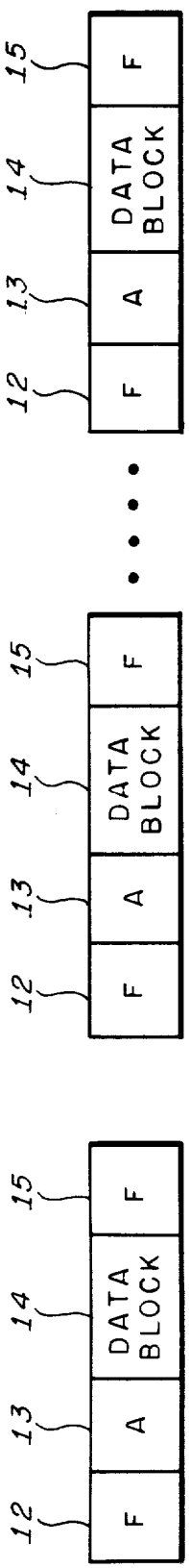
FIG. 2 is a schematic representation of the data messages provided by the sensor subsystems of the aircraft.

Referring for the moment to FIG. 2, the format for the data messages from the plural sensor subsystems and the sequence in which the messages are transmitted is illustrated. The subsystems denoted as S1, S2, . . . , SN transmit respective messages as indicated on the Figure. Each message consists of a start flag 12 identifying the start of the message followed by an address 13 identifying the sensor subsystem source of the data. A data field 14, following the address 13, comprises a sequence of bytes conveying the information with respect to the respective sensors of the subsystem. Each byte, for example, may comprise eight bits. The data field 14 is of variable length dependent on the number of bytes contained therein. An ending flag 15 follows the data block 14 identifying the end of the message. The system in which the present invention is included, utilizes a single, bit serial data bus to which all of the sensor subsystems S1, S2, . . . , SN are connected. Each of the messages illustrated in FIG. 2 are placed on the bus by the associated subsystem in bit serial fashion with the messages S1, S2, . . . , SN being transmitted sequentially.

Referring again to FIG. 1, serial data bus 20 receives the bit serial data from the sensor subsystems of the aircraft as described above with respect to FIG. 2. The bus 20 is a high speed serial bus for conveying a large amount of information from the plural sensor subsystems to the processors 10 and 11 of the automatic flight control system during each iteration of the flight control programs. An active bus frame or cycle is utilized during which all of the sensor subsystems transfer their data messages via the bus 20 to the processors 10 and 11 in a manner to be described.

The bit serial data on the bus 20 is buffered by a receiver 21 which applies the bit serial data to a serial-to-parallel converter 22. The serial-to-parallel converter 22 assembles the bit serial data on the bus 20 into words or bytes, of for example, eight bits each, representative of the data words provided by the sensors of the sensor subsystems. Whenever the serial-to-parallel converter 22 has assembled a byte, the converter 22 issues a data available signal to the A-processor 10 on a bus 23. The serial-to-parallel converter 22 is commanded by the processor 10 to place the assembled byte on a parallel data bus 24 in response to a read command signal issued by the processor 10 to the converter 22 on a bus 25. In response to the read command signal on the bus 25, the converter 22 latches the assembled byte onto its output where it is sampled by the processor 19 via the bus 24.

Thus, the A-processor 18 controls the timing of the serial bus 20 and the acquisition of the data from the sensor subsystems during the active bus frame. During this time, the A-processor 10 suspends its normal processing routines and dedicates its control fully to receiving the high speed bytes sequentially provided by the converter 22. During the active bus cycle when the A-processor 10 is receiving the data from the serial-to-parallel converter 22, the B-processor 11 is performing its normal processing routines since the processor 11 does not interface with the input bus 20. As the A-processor 10 receives the data on the bus 24, the processor 10 sequentially stores the data in an A-data storage element 26 associated therewith. This sequence of the data available signal issued by the converter 22 to the processor 10 on the bus 23 and the read command signal issued by the processor 10 to the converter 22 on the bus 25 results in the processor 10 acquiring a byte of data and storing this byte in its data storage element 26. This process continues at a rapid rate during the active bus frame until all of the messages from the sensor subsystems have been acquired by the processor 10 and stored in the data storage element 26 for later usage during the flight control program iteration. The processor 10 identifies the sensor subsystem from which a message is being received via the subsystem address 13 discussed above with respect to FIG. 2. The A-processor 10 determines when the active bus frame is completed by identifying the address within the data message from the last subsystem to transmit, identified as subsystem N in FIG. 2.

As described above the serial-to-parallel converter 22 provides the sensor data via the bus 24 to the processor 10 which stores the data in predetermined areas of its data storage element 26 in accordance with the respective sensor subsystem addresses. Simultaneously and independently, the serial-to-parallel converter 22 provides the data bytes to an independent data storage element 27 via a data path 28 that is independent of the processor 10. After the active bus frame is completed and all sensor subsystems have transferred their respective data to the independent data storage element 27, the B-Processor 11 can thereafter access the data storage element 27 and transfer all the data stored therein into a data storage element 29 associated therewith for use during the iteration of the flight control program for performing control and monitoring functions.

Thus, the independent data storage element 27 stores all of the data provided during a complete bus frame as it is being accessed and controlled by the A-processor 10 such that the B-processor 11 has indepedent access to the entire set of bus data after completion of the active bus frame. The data is stored in predetermined areas of the storage element 27 in accordance with the sensor subsystem providing the data. These areas are designated as S1, S2, . . . , SN corresponding to the respective sensor subsystems. This subsystem addressing is controlled by the A-processor 10 via a subsystem identifier address provided to the storage element 27 on an address bus 30. The addresses on the bus 30 are derived from the address field 13 of the respective subsystem messages illustrated in FIG. 2. The subsystem identifier address on the bus 30 controls the addressing of the data blocks arriving from the sensor subsystems as they sequentially are provided to the data storage element 27 via the parallel data bus 28. The subsystem identifier address provides the initial addresses for the areas of the storage element 27 determining where the blocks of data from the subsystems will reside in the storage element 27, respectively. Thus, as the data is received it is stored in the data storage element 27 in a specific order such that when the B-processor 11 reads the data it has information with respect to the specific subsystems from which the respective sets of data are received. As the A-processor 10 receives each byte of data from the serial-to-parallel converter 22, the processor 10 provides a write command to the storage element 27 via a bus 31 to strobe the byte into the storage element 27 within the area controlled by the subsystem identifier address on the bus 30 at a location determined in a manner to be described.

The A-processor 10 provides the starting address via the address bus 30 for entering a message from a sensor subsystem into the appropriate section of the data storage element 27. The A-processor 10 also stores the same data message in a similar arrangement in its data storage element 26. The A-processor 10 internally determines the addresses of the locations within the data storage element 26 whereat the bytes of the message are to be stored. If the A-processor 10 were to utilize these addresses for determining the locations for the individual bytes within a subsystem section of the data storage element 27, the processor 10, due to a fault or an error might scramble these addresses so as to place erroneous data in the memory locations. This erroneous data would then be utilized both by the A-processor 10 via its data storage element 26 and the B-processor 11 via its data storage element 29 after receiving the scrambled data from the independent data storage element 27. Since the same scrambled data would be utilized by both processors, the error may not be detected by the redundancy or monitoring techniques incorporated in the system. Such data scrambling would have the same effect as corruption of the data by the A-processor 10 and then transmitting the corrupted data to the B-processor 11 for use in redundancy or monitoring processes.

To prevent such data scrambling, an independent data storage sequencer 32 is utilized in providing the addresses, via a data addressing bus 33, within the data blocks S1, S2, . . . SN of the data storage element 27 for entering the bytes of the sensor subsystem messages. The independent data storage sequencer 32 provides a sequence of addresses independently of the A-processor 10. For each data message from a sensor subsystem, the independent data storage sequencer 32 is initially cleared to zero by an address clear signal issued by the A-processor 10 via a bus 34. As the bytes of the subsystem message are received from the serial-to-parallel converter 22, the address provided on the bus 33 by the independent data storage sequencer 32 is incremented sequentially for each byte of data received. When the ending flag 15 (FIG. 2) of the message is received by the processor 10, the address for the next message to be received is provided by the A-processor 10 to the independent data storage element 27, the independent data storage sequencer 32 is cleared to zero via the signal on the bus 34 and the addresses are incremented via the signals on the bus 35 for each byte received in the new message. This process continues until all of the subsystem messages have been received completing the active bus frame. After the entire bus frame is complete, all of the data from all of the sensor subsystems provided on the serial data bus 20 are resident in the data storage element 26 of the A-processor 10 and in the appropriate areas S1, S2, . . . , SN of the independent data storage element 27. The data in the storage element 26 is utilized for later processing during the flight control program iteration by the processor 10 and the data in the storage element 27 is thereafter transferred to the B-processor 11 for storage in its data storage element 29 for its processing during the flight control program iteration.

The apparatus of the present invention is implemented in such a manner that the A-processor 10 cannot corrupt or destroy any data stored within the independent data storage element 27. The A-processor 10 cannot write into the data storage element 27. The data that is written into the storage element 27 is provided directly via the independent data bus 28. Only the write command on the bus 31 and the subsystem identifier address on the address bus 30 is provided by the A-processor 10 to the independent data storage element 27.

After an active bus frame is completed, the data stored in the storage element 27 is transferred by the B-processor 11 into its data storage element 29 thereby releasing the data storage element 27 for the next active bus frame. The B-processor 11 addresses the storage element 27 with a sequence of read addresses via a read address bus 36 and issues corresponding read command signals on a bus 37 to the storage element 27 for sequentially providing the bytes stored in the storage element 27 to the B-processor 11 via a parallel data bus 38 for transfer to its data storage element 29. Essentially, the processor 11 performs a block move of the entire data contents stored in the data storage element 27 to the data storage element 29 for use by the B-processor 11 during the flight control program iteration.

As previously described, the write addressing of the data storage element 27 for the individual data bytes within a subsystem data message is controlled by the independent data storage sequencer 32 such that the A-processor 10 cannot scramble this data within the data storage element 27. The addressing, however, for determining the area in the data storage element 27 for locating each of the subsystem data messages is performed by the A-processor 10 via the bus 30 and these location areas may be scrambled by the A-processor 10. If this occurs, both the processor 10 and the processor 11 may operate upon the same scrambled data thereby possibly defeating the redundancy or monitoring procedures utilized and permitting the fault or error to remain undetected. The undetected scrambled data may precipitate a dangerous condition in the aircraft. The system is protected against this type of scrambling by utilizing the source identifier address 13 (FIG. 2) within each of the data messages from the respective subsystems. When the B-processor 11 transfers the data from the data storage element 27 to the data storage element 29, the processor 11 verifies the source addresses to ensure that scrambling of subsystem data through a failure of the A-processor 10 has not occurred.

Additionally, each data source transmits within the data block 14 of FIG. 2, a data checksum tracer and a new-data update validation tracer provided by a counter (not shown). These data tracers are utilized by both the A-processor 10 and the B-processor 11 to validate the data stored in the elements 26 and 27. This validation procedure protects against faults and/or design errors of the type which alter data bit patterns and/or inhibit data transfer through the single-string paths 20, 21, 22, 23 and 24.

In summary of the operation of the apparatus of the present invention, the messages illustrated in FIG. 2 are sequentially transmitted in bit serial fashion at high speed on the serial data bus 20. Each subsystem transmits its entire data message which is formatted into parallel bytes by the converter 22. The processor 10 utilizes the address 13 (FIG. 2) to select the area within the storage element 27 at which to store the subsystem information. The processor 10 then clears the address in the independent data storage sequencer 32 via the address clear signal on the bus 34. The bytes of the message are then received by the processor 10 and transferred to the data storage element 26. Simultaneously, the processor 10 commands the bytes to be stored in the data storage element 27 via the write command on the bus 31 in the area determined by the address on the bus 30 at the locations determined by the addresses on the bus 33 from the independent data storage sequencer 32. As the sequential bytes are received, the processor 10 commands the sequencer 32 to sequentially increment the address count such that the sequential bytes are stored at sequential locations in the appropriate area of the data storage element 27. The processor 10 recognizes that an entire message has been received by detecting the ending flag 15 (FIG. 2). Processor 10 then prepares to receive the next subsystem data message by addressing the data storage element 27 via the subsystem identifier address bus 30 and clearing independent data storage sequencer 32 via the address clear signal on the bus 34. The processor 10 determines that all of the subsystem data messages have been received by identifying the address within the data message from subsystem SN. At the completion of the active bus frame, all of the subsystem data resides in the data storage element 26 and in successive areas within the data storage element 27. Thereafter, the data is transferred by the B-processor 11 from the data storage element 27 to the data storage element 29. The data storage element 27 is thereby released for use by the A-processor 10 in receiving the next sequential bus frame. The data then residing in the storage elements 26 and 29 are utilized by the processors 10 and 11, respectively, in preforming active autopilot functions and monitoring processes as described in said Ser. No. 739,583 or utilized in redundancy cross processor monitoring for detecting faults and errors.

Thus, by utilizing the present invention, data errors introduced into the data after transmission will be detected by at least one of the processors, which can then react to prevent potential resultant hazardous conditions in the automatic flight control system. As is well known, a detected error or fault may result in various reversionary modes of the automatic flight control system such as disengaging a particular mode or possibly disengaging the entire automatic flight control system. The present invention provides independent distribution of serial data bus information to two redundant processing elements such that an error or fault within one processor cannot undetectibly corrupt or scramble the data utilized by more than one of the processors simulataneously. Such data integrity to multiple processors is necessary for implementation of a cross-processor performance assessment mode for hazard protection. The present invention protects the system against hazardous automatic flight control system malfunctions resulting from corruption or scrambling of the incoming primary data by one of plural redundant processors.

While the invention has been described in its preferred embodiments, it is to understood that the words which have been used are words of description rather than limitation and that changes may be made within the purview of the appended claims without departing from the true scope and spirit of the invention in its broader aspects.

We claim:

1. Data management apparatus for an automatic flight control system having at least first and second digital data processor means, said first and second processor means including respective first and second data storage means, said system including sensor means for providing data signals to said first and second processor means for storage in said respective first and second data storage means, said apparatus comprising
    means for conveying said data signals from said sensor means to data bus means,
    first data path means for directing said data signals from said data bus means to said first processor means for storage in said first data storage means,
    independent data storage means,
    second data path means for directing said data signals from said data bus means to said independent data storage means for storage therein,
    independent address generator means for providing addresses to said independent data storage means at which to store said data signals, and
    means for transfer directing said data signals stored in said independent data storage means to said second processor means for storage in said second data storage means.

2. The apparatus of claim 1 in which said conveying means passes said data signals from said sensor means to said data bus means in bit serial fashion.

3. The apparatus of claim 2 in which said conveying means includes a serial-to-parallel converter for converting said data signals in bit serial format into a sequence of parallel data bytes,
    said first processor means being coupled to said serial-to-parallel converter for receiving said sequence of parallel data bytes for storage in said first data storage means.

4. The apparatus of claim 3 in which
    said serial-to-parallel converter includes means for providing a data available signal to said first processor means when said serial-to-parallel converter is ready to transmit a data byte, and said first processor means includes means for providing a read command signal to said serial-to-parallel converter for commanding said converter to transmit an available data byte to said first processor means.

5. The apparatus of claim 1 in which said sensor means comprises a pluarlity of sensor subsystems, each said sensor subsystem providing a data message including an address identifying said subsystem, the plurality of data messages from said plurality of said data subsystems comprising said data signals.

6. The apparatus of claim 5 in which said independent data storage means includes areas for storing the data messages from said data subsystems, respectively.

7. The apparatus of claim 6 in which said first processor means includes means for providing an address signal to said independent data storage means for addressing an area thereof corresponding to the data subsystem currently providing its data message to said first processor means, and means for providing an address incrementing signal to said independent address generator means for incrementing the addresses provided thereby to said independent data storage means in accordance with sequential data bytes contained in the data message from a data subsystem.

8. The apparatus of claim 7 in which said first processor means includes means for providing an address clearing signal to said independent address generator means for resetting the addresses provided thereby to a predetermined initial address corresponding to the first byte of said sequence of data bytes contained in a data message from a data subsystem.

9. The apparatus of claim 6 in which said second processor means includes means for determining if the addresses contained in the data messages transferred from said independent data storage means correspond to the data subsystems from which the data messages should have originated.

* * * * *